United States Patent

[11] 3,577,735

[72] Inventor Gunther Schmidt
 Ottobrunn-Riemerling, Germany
[21] Appl. No. 871,644
[22] Filed Nov. 5, 1969
[45] Patented May 4, 1971
[73] Assignee Bolkow Gesellschaft mit beschrankter
 Haftung, Germany
[32] Priority Jan. 21, 1967
[33] Germany
[31] B90836
 Continuation of application Ser. No.
 698,574, Jan. 17, 1968, now abandoned.

[54] LIQUID FUEL ROCKET ENGINE CONSTRUCTION
 6 Claims, 2 Drawing Figs.
[52] U.S. Cl............................................. 60/207,
 60/39.74, 60/261, 415/210
[51] Int. Cl...................................................... F02k 9/02,
 F01d 9/04
[50] Field of Search......................................... 60/261,
 39.72, 39.74, 258, 204, 207; 415/(Inquired), 148,
 209, 210, 185, 191, 216

[56] References Cited
 UNITED STATES PATENTS
2,479,776 8/1949 Price............................ 60/261
2,479,777 8/1949 Price............................ 60/261
2,508,420 5/1950 Redding...................... 60/39.74
2,775,864 1/1957 Karcher....................... 60/39.72
2,844,001 7/1958 Alford......................... 415/216
2,866,313 12/1958 Holl............................. 60/261
2,914,912 12/1959 Woll............................ 60/39.72
3,286,473 11/1966 Cowell........................ 60/258
3,318,574 5/1967 Tyler........................... 415/148
3,413,810 12/1968 Kauffman.................... 60/258

*Primary Examiner*—Douglas Hart
*Attorney*—McGlew and Toren

ABSTRACT: A liquid fuel rocket engine construction includes the usual main combustion chamber having a nozzle discharge. One or more precombustion chambers are arranged ahead of the main combustion chamber in a position to discharge combustion gases generated therein through turbine blades of an auxiliary turbine arranged directly adjacent the rear end of the main combustion chamber. The auxiliary turbine drives at least two separate fuel component pumps, one of which discharges first through the walls of the main combustion chamber for cooling purposes and then into a precombustion chamber, and the other of which discharges only partially into the precombustion chamber and then into the discharge from the auxiliary turbine and into the main combustion chamber. The precombustion chamber is operated either with excess fuel or oxidizer.

The construction includes a preguide lattice or guide fin arrangement for discharging into the turbine blades and in addition in accordance with a feature of the construction, the discharge section immediately after the turbine blades is provided with a retarding afterguide lattice for guiding the fuel discharged by the turbine into the main combustion chamber and also for adding an additional fuel component, either fuel or oxidizer, at such location. In a preferred form, the trailing ends of the afterguide lattice are provided with nozzle discharge openings for facilitating the discharge of the fuel component into the main combustion chamber at such location.

LIQUID FUEL ROCKET ENGINE CONSTRUCTION

REFERENCE TO OTHER APPLICATION

The present application is a continuation of application Ser. No. 698,574, filed Jan. 17, 1968, now abandoned.

SUMMARY OF THE INVENTION

This invention relates, in general, to a construction of rocket engines and, in particular, to a new and useful liquid-fuel rocket engine of the main current type having at least one precombustion chamber which is operated with excess oxidizer or liquid-fuel and which includes an auxiliary turbine which is operated by the gases generated in the precombustion chamber to drive the two separate fuel pumps, and wherein an afterguide lattice is arranged at the discharge of the turbine which enters into the main combustion chamber to provide means for adding an additional portion of the fuel component to the gases passing through the turbine.

It is known to provide single-stage gas turbines of a high turbine pressure gradient with an afterguide lattice to reduce the great exit twist of the gases that cause a diminishing of the efficiency of the turbine. This is necessary in those instances where a multistage turbine is to be avoided due to the resultant weight increase of the unit as well as the constructional expenditure and the difficulties connected therewith. In some instances, runners or guide lattices for injecting liquid or gaseous fuel or fuel components are provided, and in addition, the fuel is passed through these and related parts for cooling the parts which are traversed thereby. In liquid fuel rocket engines of the main current type it is desirable to obtain high pressures in the main combustion chamber in order to obtain a high specific impulse and thus a good utilization of the propellant. High main combustion chamber pressures require a high pump output and thus a high output of the auxiliary turbine driving the pumps, and this requires a great working gradient. The pressures in the precombustion chamber will be the sum of the main combustion chamber pressures and the turbine gradient pressures. The precombustion chamber pressure determines the pump power delivered by the auxiliary turbine and thus the turbine gradient. The turbine efficiency is diminished when a great turbine gradient is produced which will occur by the exit twist in the current behind the turbine. The turbine efficiency reduced in this way requires a greater pressure gradient to achieve the same desired output so that the precombustion chamber pressure and thus the pump output pressure increases again which requires again an increased gradient. This shows that the turbine efficiency and the pressure difference, respectively, between the main combustion chamber and the precombustion chamber have a detrimental significance on the efficiency and weight of the engine.

In accordance with the present invention, the disadvantages mentioned above are overcome and an increased turbine efficiency is produced with a low weight expenditure by reducing the exit twist in a way such that a single stage auxiliary turbine can produce the necessary pump output and reduce the pressure difference between the precombustion chamber and the main combustion chamber.

In the preferred form of the invention the desirable effects are provided by employing a retarding guide lattice directly between the discharge of the turbine and the entrance to the main combustion chamber. In a further development of the invention, the retarding afterguide lattice provides the means for injecting the balance of the fuel component or oxidizer into the main combustion chamber. In the preferred form, the rear ends of the afterguide lattice are provided with injection apertures for injecting the fuel or the oxidizer. In some instances, it is also desirable to provide injection apertures for injecting the fuel or oxidizer on the suction side of the vanes of the retarding afterguide lattice.

The entrance of the gas from the precombustion chamber through the auxiliary turbine and into the main combustion chamber is effected in the usual manner in the form of a ring canal which presents only a part of the cross-sectional area of the main combustion chamber. A distribution of the propellant gases over the entire cross section of the main combustion chamber is possible only by installations with a high flow resistance resulting in losses so that the overall weight of the engine would be undesirably increased. This problem is solved according to the invention by injecting the balance of the fuel or oxidizer from the vanes of the retarding afterguide lattice. This produces an advancing of the main combustion chamber entrance and the resulting heating of the circular ring-shaped gas jet effects an immediate expansion into the following entire circular cross section of the main combustion chamber, without any, or with a minimum of additional guiding elements compared to the conventional type.

The injection effected according to the invention results in a high ratio of surface to volume of the injection fuel as well as in a long path in the propellant gas current so that there is little or no tendency for the injected fuel component to appear on the walls of the combustion chamber. Due to the uniform distribution of the injected fuel, a rapid and thus advantageous combustion is achieved. Thus, it is possible to obtain either a reduction of the length or weight of the combustion chamber or better combustion.

In accordance with the method of the invention, a liquid fuel rocket engine is operated with at least one precombustion chamber for burning fuel components arranged to discharge the combustion gases through an auxiliary turbine. The turbine is connected to drive the fuel component pumps, and it is arranged to discharge the gases directly into the main combustion chamber. The fuel components are directed into the precombustion chamber and the precombustion chamber is operated with an excess of either oxidizer or fuel component so that there will be a completed burning of the fuel combustion products after they are discharged through the turbine into the main combustion chamber. A feature of the method is that the gases exiting from the turbine are retarded by lattice baffling or vanes and an additional portion of the fuel component or oxidizer is introduced into the combustion products exiting from the turbine and into the main combustion chamber at such location so that these products are distributed over the combustion chamber and the efficiency of the turbine is maintained.

Accordingly, it is an object of the invention to provide a liquid-fuel rocket engine having at least one precombustion chamber which is arranged to discharge through an auxiliary turbine and into a main combustion chamber and wherein the precombustion chamber is operated with an excess of oxidizer or fuel component and an additional fuel component or oxidizer is introduced to the gases discharged from the turbine and entering into the main combustion chamber, and characterized by the provision of a retarding lattice work arranged at the discharge of the turbine for increasing the efficiency of the turbine and preferably for adding an additional fuel component or oxidizer at such location.

A further object of the invention is to provide a method for operating an internal combustion engine which includes directing a fuel component and an oxidizer to a precombustion chamber to burn the components with excess oxidizer or fuel component and thereafter direct the gaseous products through turbine blades and into the main combustion chamber, and producing a retarding and redirecting effect on the gases exiting from the turbine and simultaneously adding a further fuel component or oxidizer at such location.

A further object of the invention is to provide a liquid-fuel rocket engine which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
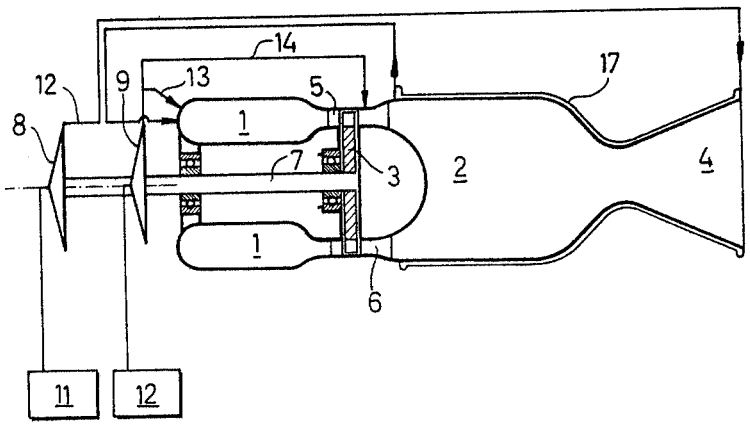
FIG. 1 is a somewhat schematic partial axial sectional view and partial elevational view of a liquid-fuel rocket engine constructed in accordance with the invention.

Referring to the drawings, in particular, the invention embodied therein comprises a main current rocket engine having a plurality of precombustion chambers 1 arranged to discharge through an auxiliary turbine 3 into a main combustion chamber 2. The main combustion chamber 2 includes the usual nozzle thrust gas discharge 4.

In accordance with the invention, in respect to the direction of flow, ahead of the turbine 3 there is arranged a preguide lattice or fin construction 5, and behind the auxiliary turbine 3 there is located a retarding afterguide lattice or fin construction 6.

The auxiliary turbine 3 rotates a shaft 7 which is connected to the propeller vanes of pumps 8 and 9 which are schematically illustrated. The pumps 8 and 9 deliver a fuel component from respective storage tanks 10 and 11. One component is fed completely through a line 12 and the other is fed partly through a line 13 to the precombustion chamber 1 and the remaining portion is fed through a line 14 to the location of the afterguide lattice 6 at the turbine discharge and entrance to the combustion chamber 2. The component fed through the line 12 first traverses through passages 15 extending along the complete length of the main combustion chamber 2 and its nozzle portion 4 in a reverse heat flow path.

Figure 2:
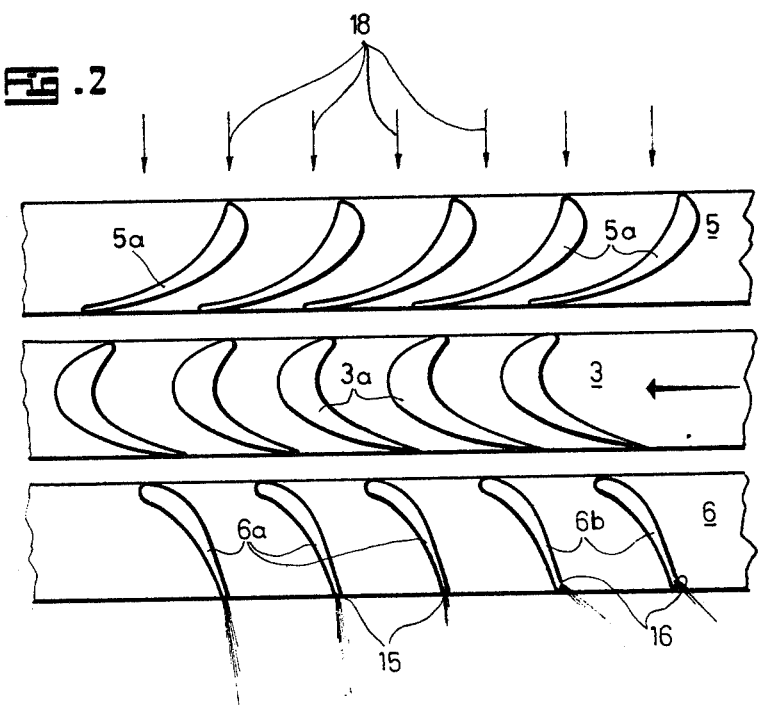
FIG. 2 is a schematic plan development of the preguide and afterguide lattice for the auxiliary turbine.

In accordance with a method of the invention, the fuel components, one of which is an oxidizer, which are fed to the precombustion chamber 1, are fed in an amount such that there will be an excess oxidizer or fuel component. The propellant gases which are generated in the precombustion chamber 1 are directed through the lattice work 5 and the turbine blades 3 and the lattice work 6 into the main combustion chamber 2. As indicated in FIG. 2, the gases generated which are indicated by the arrows 16, flow first through the vanes 5a and through the turbine blades 3a and then through the vanes 6b. In the embodiment illustrated, the vanes 6b are connected to the line 14 and a partial liquid fuel component or oxidizer is fed through nozzles 15 or 16 into the combustion gas stream which is then distributed over the complete area of the main combustion chamber 2. The balance of fuel component which is injected into the propellant gases reacts at the location of the trailing edge of the afterguide lattice 6 to provide for ideal combustion conditions within the combustion chamber 2.

By arranging the retarding afterguide lattice behind the single stage auxiliary turbine in accordance with the invention, the pressure behind the lattice becomes higher than it is behind the auxiliary turbine because velocity is transformed in the lattice into pressure. This results in two independent advantages:

1. If it is assumed that the main combustion chamber pressure of a certain combustion chamber thrust jet combination is compared with a known design without a retarding afterguide lattice and with the inventive design including one always in the same value which corresponds to a constant thrust, then the pressure in the precombustion chamber diminishes due to the reduced pressure difference between the main combustion chamber and the precombustion chamber. In this way, it is possible to make the precombustion chamber lighter with regard to its overall weight or to operate it with increased safety and service life. In addition, the power absorbed by the pumps is reduced by the lower precombustion chamber pressure since their delivery is reduced so that less power is required of the auxiliary turbine and a lower turbine gradient is achieved. This, in turn, permits a slight reduction of the precombustion chamber pressure.

2. The reduced velocity of the passing propellant gases permits either an increased stay period in the combustion chamber and thus better combustion, or permits a smaller overall length of the main combustion and thus a reduction of its weight.

While a specific embodiment of the invention has been shown and described in detail to illustrate the application of the inventive principles, it will be understood that the invention may be embodied otherwise without departing from such principles.

I claim:

1. A method of operating a liquid-fuel rocket engine of the main current type having a main combustion chamber, at least one precombustion chamber for burning fuel components arranged to discharge combustion gases through a discharge passage which is connected to a gas turbine with rotatable blades and a discharge which is connected to the inner end of the main combustion chamber, and wherein the turbine is used to drive fuel component pumps for supplying the components to both the main combustion chamber and the precombustion chamber, comprising directing at least portions of two fuel components into a precombustion chamber and operating the chamber to burn the components with an excess of one component, directing the gaseous products produced in said precombustion chamber through the turbine blades and into said main combustion chamber, operating said main combustion chamber at a predetermined pressure and maintaining a predetermined operational pressure drop through said turbine blades, producing an initially gradual retarding effect on all of the gases exiting from said turbine and before they enter into said main combustion chamber and removing swirl imparted to the products by rotation of the turbine to increase the pressure of the gases and to thereby permit operation of the precombustion chamber at a lower pressure than without said retarding effect, and simultaneously adding a further portion of the fuel components to the gases discharging from said turbine and into said main combustion chamber.

2. A liquid-fuel rocket engine of the main current type comprising wall means defining a main combustion chamber having a thrust gas nozzle discharge, at least one precombustion chamber having an annular diverging discharge passage connected to said main combustion chamber, at least one auxiliary turbine having turbine blades disposed in said discharge passage for rotational operation by the products of combustion from said precombustion chamber, a fuel component pump driven by said turbine for directing fuel components into said precombustion chamber for combustion therein, and means for permitting pressure operation of said precombustion chamber at a pressure which may be maintained sufficiently high to maintain a satisfactory pressure drop across said turbine but at a pressure not greatly in excess of said main combustion chamber pressure comprising afterguide retarding and reguiding vanes located across the whole discharge passage between said turbine and said main combustion chamber and in the entire exhaust gas flow of and directly adjacent said turbine blades, said guide vanes radially oriented and being airfoil shaped and defining therebetween diverging flow passages to increase the pressure and reduce the swirl of all of the turbine exhaust gases.

3. A liquid-fuel rocket engine according to claim 2, wherein said precombustion chamber is operated with an excess of at least one fuel component said fuel component pump being connected to said afterguide and retarding vanes for discharging said fuel component into said discharge passage and into said main combustion chamber to provide completed combustion therein.

4. A liquid-fuel rocket engine according to claim 2, wherein said afterguide retarding and reguiding vane includes a lattice formation of a plurality of vane elements having a widened nose portion and a trailing portion adjacent the combustion chamber, said vane construction including apertures on the trailing edge thereof, said fuel component pump being connected to direct a fuel component to said vane construction for discharge through the apertures into said vane combustion chamber.

5. A liquid-fuel rocket engine according to claim 2, wherein said vane construction includes a plurality of vane elements having apertures at the rear end thereof for the discharge of a fuel component therethrough, said fuel component pump being connected to said vane elements and discharging through the rear apertures into said combustion chamber.

6. A liquid-fuel rocket engine according to claim 2, including a shaft for said auxiliary turbine rotatably supported centrally within said precombustion chamber, at least one additional fuel component pump, said fuel component pump and said one additional fuel component pump having a rotor on said turbine shaft and being rotatable thereby, one of said fuel component pumps being connected to discharge a fuel component into the walls of said main combustion chamber for cooling said walls and then into said precombustion chamber, the other of said fuel component pumps being arranged to discharge a portion of the fuel into said precombustion chamber and a further portion into said discharge passage between said turbine and said main combustion chamber.